Oct. 20, 1959 C. G. SVALA 2,909,609

CONNECTING DEVICE FOR SENDING TONE FREQUENCY ALTERNATING CURRENT SIGNALS OVER A TWO-CONDUCTOR LINE

Filed Oct. 5, 1955 2 Sheets-Sheet 1

INVENTOR
CARL GUNNAR SVALA
BY Hane and Nydick
ATTORNEYS

CONNECTING DEVICE FOR SENDING TONE FREQUENCY ALTERNATING CURRENT SIGNALS OVER A TWO-CONDUCTOR LINE

Filed Oct. 5, 1955 2 Sheets-Sheet 2

INVENTOR
CARL GUNNAR SVALA
BY Hane and Nydick
ATTORNEYS

United States Patent Office 2,909,609
Patented Oct. 20, 1959

2,909,609

CONNECTING DEVICE FOR SENDING TONE FREQUENCY ALTERNATING CURRENT SIGNALS OVER A TWO-CONDUCTOR LINE

Carl Gunnar Svala, Alvsjo, Sweden, assignor to Telefonaktiebolaget L M Ericsson, Stockholm, Sweden, a corporation of Sweden Application October 5, 1955, Serial No. 538,668

Claims priority, application Sweden October 25, 1954

11 Claims. (Cl. 179—16)

This invention relates to signal transmission particularly in automatic telephone systems, in which tone frequency alternating current signals are sent over a two-conductor line from a sender to a receiver. The receiver may be included in an exchange equipment or be connected to the telephone system over another line, which is in communication with the first mentioned line. The alternating current signals consist of damped oscillations of short duration which are generated in the sender by the charge or discharge of an energy accumulating impedance in an oscillating circuit comprising a capacitive component and an inductive component. In the sender there is furthermore located a number of switches connected to different terminals of the oscillating circuit, so that the operation of one of these switches will cause closing of the oscillating circuit and connection of said impedance to this, thus causing a damped oscillation corresponding to the operated switch, which oscillation, in turn, causes a tone frequency current on the line.

Such a connecting device is described for instance in United States Patent 2,732,432, and this invention constitutes an improvement of said patent.

In the known connecting device there is used a transformer for connecting the oscillating circuit to the line. To save material the winding of the transformer included in the oscillating circuit is provided with terminals which determine the frequency of the oscillating circuit. This causes the inconvenience that the input amplitude of the damped oscillation will vary with the signal frequency owing to the fact that different numbers of turns of the winding of the transformer included in the oscillating circuit will be connected for each signal frequency. As a result, input amplitude of the signal voltage is greatest for the highest frequency, which increases the likelihood of cross-talk. Then the damping will be highest for the highest signal frequency. As the band width of the filters is reciprocally proportional to the pulse length it has been found necessary to arrange the frequency of the signals in a geometrical progression, which is uneconomical with regard to the band width available.

According to this invention the same output voltage is obtained for all signal frequencies. Furthermore the damping is or may be made equal for all frequencies, because the load impedance generated by the impedances of the line and the receiver is not transformed back to the signal circuit over a transformer, the transformation ratio of which is varying with the selected signal frequency. This is achieved by providing as the capacitive component of the oscillating circuit a voltage divider, which transmits the tone frequency current from the oscillating circuit to the line, while the inductive component has said terminal for the switches which determines the frequency of the oscillating circuit.

The invention will be described more in detail with reference to the enclosed drawings, Fig. 1 and Fig. 2, which show how the invention may be carried into effect to generate currents for numerical signals in a subscriber's apparatus and emit signals to a telephone exchange over a subscriber's line.

Figure 1:
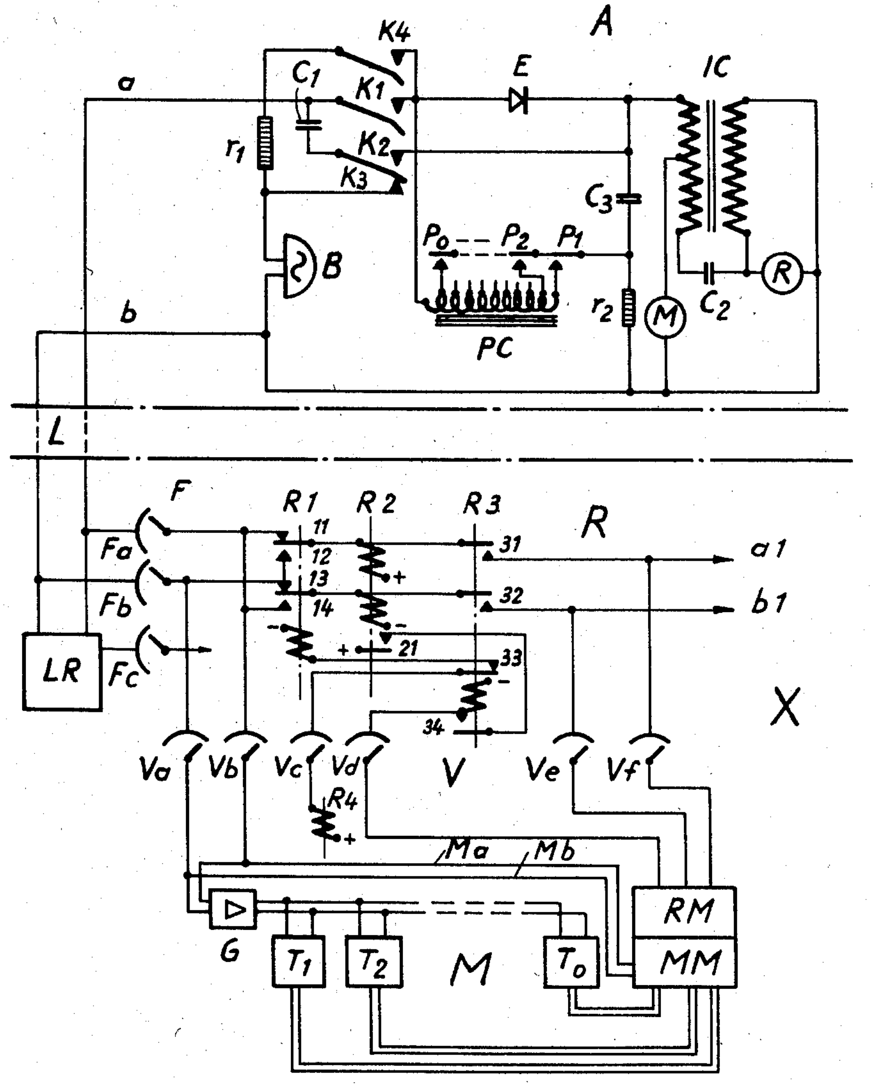
Fig. 1 shows a subscriber's apparatus, where the energy accumulating impedance is a condenser, and devices in the telephone exchange.

Fig. 1 shows a subscriber's apparatus A, which by means of a line L is connected to a telephone exchange X. In the subscriber's apparatus a bell B is connected in series with the condenser C1 between the line branches *a—b*, when the apparatus is not in use. The hook switch contains the contacts K1—K4, which are actuated when the hand microtelephone is lifted. The inductance coil IC, the microphone M, the receiver R and the condenser C2 form a conventional talking circuit.

The *a*-branch of the line is connected to the talking circuit over a rectifier E. The signal sender of the apparatus is connected in parallel with the rectifier E and comprises a key set with ten push buttons P1, P2 . . . P0, an inductance coil PC with terminals for the push buttons P1–P0 and two condensers C1 and C3. As mentioned before, condenser C1 is also used for admitting ringing signals to the bell B, when the apparatus is not in use. Furthermore there are two resistances *r*1 and *r*2, *r*1 serving to keep closed a direct current circuit over the line L during the signal transmission and *r*2 serving to discharge the condenser C3. The resistance *r*2 is high in relation to the reactance in the capacitive or inductive component of the oscillating circuit.

The telephone exchange X includes a line equipment IR for the subscriber's line L, a line finder F with a relay set R and a register M with a register finder V. Register M includes an amplifier G, ten filters T1, T2 . . . T0, a signal receiver MM and a registering mechanism RM.

The connecting device functions in the following manner. At a call from the apparatus A a circuit from the line equipment LR is closed over the line L, the contact K1, the rectifier E, the inductance coil IC and the microphone M. The line L is connected over the line finder F to the relay set R and over the line finder V to the register M. The relay R1 attacts its armature in a circuit over the contact 33, the wiper V*c* and the winding on the test relay R4 of the register finder V. The contacts 11—14 are actuated. The following circuit is completed: +, the upper winding of the relay R2, the contact 12, the wiper F*b*, the *b*-wire, the bell B, the resistance *r*1, the contacts K4 and K1, the *a*-wire, the wiper F*a*, the contact 14, the lower winding of the relay R2, to minus. It is not necessary that the relay R2 operates in this circuit, as the communication can be controlled by means of voltage testing devices connected to the wires M*a*, M*b* in the receiver MM. The condenser C1 is charged over the microphone M and the inductance coil IC in a circuit, which is connected in parallel with the resistance *r*1, for which reason the resistance *r*1 should be so high that the charge of the condenser will be substantially the same for all subscriber's lines L.

A buzzer tone emitted from the receiver MM over the wires M*a*—M*b* and the wipers V*a*—V*b*, is received in the telephone receiver R and indicates that the digit dialling may begin. When one of the push buttons P1–P0 is pushed, e.g. P2, an oscillating circuit is closed including the condensers C1 and C3, and the part of the winding on the inductance coil PC lying to the left of the push button P2. The condenser C3 is charged in this oscillating circuit and causes a damped oscillation, whereby an alternating current will arise over the condenser C1, causing a tone frequency alternating current on the line L. The alternating current is amplified in the amplifier G, passes the band filter T2 corresponding to the push button P2 and is received in the signal receiver MM on particular relays which cause a registering in the registering mechanism RM. The registering procedure is described in the Swedish Patent No. 144,299 (U.S. Patent 2,706,746 or the German Patent 886,929). The alternating current signal passes the induction coil IC and is heard as dial tone by the calling person, which facilitates the digit dialling. When the push button P2 is released, the condenser C3 is discharged over the resistance *r*2 and the microphone M.

After all the digits in a subscriber's number have been dialled on the key set P1–P10 the register M sets up a communication over the wires *a*1, *b*1, whereby circuits for the setting of selectors are closed over the wipers V*e* and V*f*. Then the relay R3 is operated in a circuit over the wiper V*d*. The contacts 31—34 are actuated. The relay R1 releases its armature due to opening of contact 33 and the relay R2 is operated in the following circuit: +, the upper winding of the relay R2, the contact 11, the wiper F*a*, the *a*-wire, the contact K1, the rectifier E, the induction coil IC, the microphone M, the *b*-wire, the wiper F*b*, the contact 13, the lower winding of the relay R2, to minus. The contact 21 is closed and the relay R3 is kept energized over the contacts 21 and 34, whereupon the register M is disconnected. The sender in the subscriber's apparatus A is then short-circuited by the rectifier E.

It is essential that the alternating current signals from the sender in the subscriber's apparatus have the same amplitude independent of the frequency. This is achieved by the condenser C1 being always charged up to approximately the same voltage, and by the line L charging the oscillating circuit equally during all signals, which is achieved by means of the condensers C1 and C3. It is however also essential that the duration of the signals is independent of the frequency, for which reason the damping in the oscillation circuit has to be equal for all signals. This is achieved by winding the inductance coil PC in such a way that the relation between the inductance of the coil and its resistance will be substantially equal for all terminals on the coil.

When the receiver MM is connected to the line L the microphone M is disconnected or otherwise rendered inoperative so that disturbing tone frequency currents may not be emitted. This occurs by means of the rectifier E and by turning the current direction of the line with the relay R1.

Figure 2:
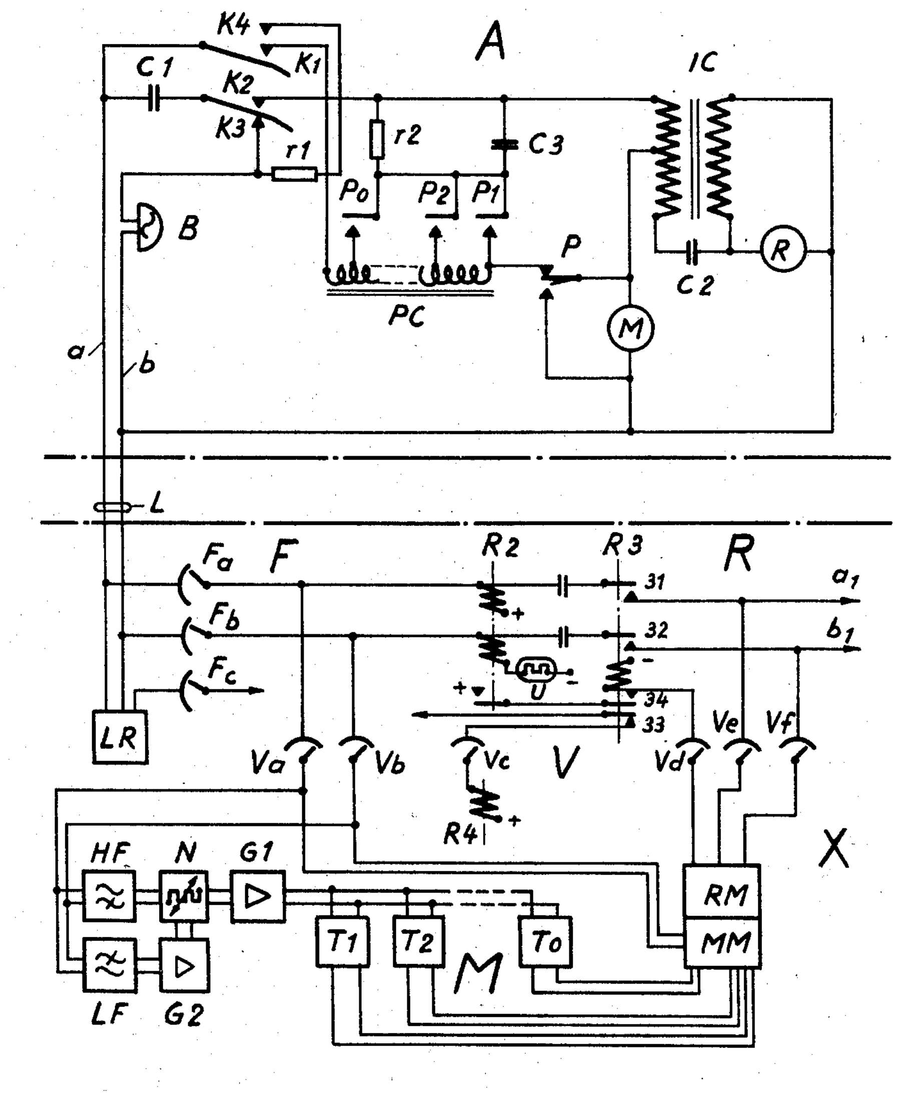
Fig. 2 shows a subscriber's apparatus, where the energy accumulating impedance is an inductance coil, the devices in the telephone exchange differing from those in Fig. 1 by the protection of the receiver against tone signals from the microphone of the subscriber's apparatus.

Fig. 2 shows an embodiment of the invention in which turning of the current direction of the line is not required. The energy accumulating impedance is here an inductance coil PC with ten windings connected in series. The key set consists not only of the ten push buttons P1, P2 . . . P0 but contains also a common contact device P, which is actuated by all the push buttons. When the hand microtelephone is lifted the contacts K1—K4 of the hook switch are actuated and the subscriber's apparatus A is connected to the link circuit R over the line finder F and to the receiver MM in the register M over the register finder V in the telephone exchange X. The impedance PC is charged in the following circuit: +, the upper winding of the feeding relay R2, the wiper F*a*, the wire *a*, the contact K1, the impedance PC, the contact device P, the microphone M, the wire *b*, the wiper F*b*, the lower winding of the relay R2, the thermistor U, to minus.

Tone frequency currents, which are generated by the microphone, cannot reach the receiver MM owing to a damping device N connected between the high pass filter HF and the amplifier G1. The low pass filter LF does not transmit talking currents. When a push button, e.g. P1 is pushed, the condenser C3 is first connected to the coil PC, and then the contact device P is actuated. The microphone M is short-circuited and the current through the coil PC is interrupted. A damped oscillation arises in the oscillating circuit C1—C3—PC, whereby a tone frequency voltage over the condenser C1 is supplied to the line L. At the same time a circuit is closed including the bell B, the resistance *r*1 and the contact K4. The resistance *r*1 is however so high, that a considerable decrease of current will occur in the feeding relay R2 and a low frequency voltage wave passes the low pass filter LF and the amplifier G2, thus producing temporarily a heavy impedance decrease in the damping device N so as to permit passage of the tone signal generated by the oscillating circuit C1—C3—PC through the high pass filter HF, the damping device N, the amplifier G1 and in this case the filter T1 to the receiver MM. When the signal is ended the condenser C3 is discharged over the resistance *r*2 and the coil PC will again be energized. As will be noted in this case also the damping in the oscillating circuit becomes independent of the frequency and the input amplitude is determined by the magnetic energy of the coil PC, said energy being also independent of the frequency. The energy of the coil PC may be kept comparatively independent of the resistance of the line L by means of the thermistor U.

The register mechanism RM, the relay R3 and the line equipment LR have the same functions as in Fig. 1. The test circuits for the line finders F and V over the wipers F*c* and V*c*, respectively, are not essential for the understanding of the invention and they are therefore only diagrammatically indicated in the drawings.

I claim:

1. In an automatic telephone system, in combination, a telephone exchange including a source of direct current, a signal sender, and a two-wire line connecting said sender with said exchange, said exchange comprising a receiver including a plurality of filters tuned for different voice frequencies, a registering means connected to said receiver, and means connecting said line to said receiver; said sender comprising an energy accumulating impedance means connectable with said direct current source over said line, an oscillating circuit including said impedance means and composed of at least three components, said components including an inductance coil having a plurality of tap terminals, a larger and a smaller capacitance means, said capacitance means constituting a voltage divider, the larger capacitance means being connected to said line; a normally open key for each of said tap terminals, each of said keys when operated closing said oscillating circuit and energy accumulated in at least one of said components causing a damped oscillation with a frequency representative of the closed key for transmitting, by means of the larger capacitance means, a voice frequency signal over said line to and through the respective filter, said signal activating the receiver for setting the registering means in accordance with the closed key, and resistance means for discharging the smaller capacitance means upon the completion of each signal.

2. A telephone system according to claim 1, wherein the relation between the inductance and the resistance in the oscillating circuit by the closing of a key is substantially uniform for all said terminals of the coil.

3. A telephone system according to claim 1, wherein the larger capacitance means is connected in a charging circuit energized by said D.-C. source, said charging circuit being controlled by said switch means, and the smaller one of said capacitance means is included in said oscillating circuit in series with said inductance coil, said oscillating circuit being energized for charging said smaller capacitance means upon closing of one of said keys.

4. A telephone system according to claim 1, wherein the larger one of said capacitance means is connected with said direct current source in an energizing circuit controlled by said keys, the smaller capacitance means being connected in a charging circuit including in series said larger capacitance means and the winding portion of said inductance coil corresponding to the operated key, said smaller capacitance means causing said damped oscillation and said larger capacitance means said signal.

5. A telephone system according to claim 4, wherein said inductance coil is connected in an energizing circuit with said current source, said energizing circuit being connected in parallel with said large capacitance means, said energizing circuit including switch contact means operatively coupled with each of said keys to break said circuit upon operation of any one of said keys.

6. A telephone system according to claim 1 and further comprising in said signal sender a resistance means connected in parallel with said large capacitance means and in circuit with said energy accumulating impedance, and comprising in said exchange relay means for controlling said switch means, said source of current, said relay means, said line and said resistance means being connected in a holding circuit arranged to be closed during the transmission of a signal by the voltage over said resistance means when charging said energy accumulating impedance means.

7. In an automatic telephone system, in combination a subscriber's instrument having a microphone, a signal sender associated with said instrument, a telephone exchange including a source of direct current, and a two-wire line connecting said instrument with said exchange, a receiver for voice frequency signals in said exchange, said receiver including a plurality of filters tuned for different voice frequencies, a registering device in said exchange connected with said receiver, switch means connecting said line to said receiver, an oscillating circuit in said sender, said oscillating circuit including an energy accumulating impedance, an inductance coil having a plurality of terminals and two capacitors having different capacitances, said impedance being connected to said current source over said line and said two capacitors forming a voltage divider, a plurality of keys one for each of said terminals, circuit means connecting said instrument and the larger capacitor in series with said line, operation of any one of said keys closing an energizing circuit for said oscillating circuit to cause, by means of the smaller capacitor, a damped oscilaltion in said circuit, said oscillation causing the larger capacitor to transmit a voice frequency signal through the respective filter and the line to the receiver, said receiver being activated to set said registering device in accordance with the operated key, and means for discharging the smaller capacitor upon the completion of each signal.

8. A telephone system according to claim 7, and further comprising in said sender a resistance means connected in parallel with said larger capacitor and in circuit with said energy accumulating impedance, and comprising in said exchange a relay means for controlling said switch means, said source of current, said relay means, said line and said resistance means being connected in a holding circuit arranged to be closed during the transmission of a signal.

9. A telephone system according to claim 7, and further comprising rectifying means connected in parallel with said large capacitor, and means in said exchange to reverse the direction of the current in the line when signals are sent from the sender to the receiver.

10. A telephone system according to claim 7, wherein said inductance coil and the microphone of said instrument are included in an energizing circuit with said D.-C. source parallel to said large capacitor, and further comprising switch contact means operable by any of said keys to interrupt said energizing circuit in response to each signal.

11. A telephone system according to claim 10, wherein said switch contact means are connected with said microphone in a circuit in which said contact means short circuit the microphone during each signal simultaneously with said interruption of the energizing circuit for the inductance coil, and further comprising circuit means in the exchange controlled by said change in the current condition to render the receiver operative for setting the registering device in response to each signal and to render the receiver inoperative upon completion of each signal.

References Cited in the file of this patent

UNITED STATES PATENTS

| | | |
|---|---|---|
| 2,542,592 | Styren | Feb. 20, 1951 |
| 2,554,201 | Lundkvist | May 2, 1951 |
| 2,706,746 | Hullegard et al. | Apr. 19, 1955 |
| 2,732,432 | Hullegard | Jan. 24, 1956 |